U. KOHLER.
TACHOMETER.
APPLICATION FILED AUG. 21, 1912.

1,057,064.

Patented Mar. 25, 1913.

2 SHEETS—SHEET 1.

Witnesses

Inventor
Ulrich Kohler
by Otto Munk
his Attorney

UNITED STATES PATENT OFFICE.

ULRICH KOHLER, OF BERNE, SWITZERLAND, ASSIGNOR TO HASLER A. G. VORMALS TELEGRAPHEN WERKSTÄTTE VON G. HASLER, OF BERNE, SWITZERLAND, A CORPORATION OF SWITZERLAND.

TACHOMETER.

1,057,064.      Specification of Letters Patent.      Patented Mar. 25, 1913.

Application filed August 21, 1912. Serial No. 716,128.

*To all whom it may concern:*

Be it known that I, ULRICH KOHLER, a citizen of the Swiss Confederation, and residing at Berne, Switzerland, have invented certain new and useful Improvements in Tachometers, of which the following is a specification.

My invention relates to a tachometer of the known type comprising several measuring pieces operating during equal measuring periods to advance a pointer, each measuring piece being shifted in turn during one of said periods by the spindle under test a distance corresponding to the speed of said spindle, while the piece acted upon in the immediately preceding period by the spindle is held fast in the position taken up at the end of this period, and the piece previously held fast is simultaneously released. Known tachometers of this kind are very complicated, require careful and skilled attention, and not only are expensive to manufacture but, owing to the presence of parts sensitive to vibration and other external influences, are not reliable in operation.

A primary object of my invention is to provide an improved tachometer of this type of extremely simple, yet substantial construction, to which these defects are not attached. To this end I arrange the measuring pieces around a guide member which is intermittently rotated in such manner that at the end of each equal period, i. e. a measuring period, it is rotated through a predetermined, constant angle, and during this rotatory movement one of the measuring pieces comes into engagement with one of the members driven by the measuring spindle, while owing to the rotation of the guide member the previous piece comes within the range of a detent, and for the same reason the piece previous to this is released from the detent.

One illustrative embodiment of my invention is represented by way of example in the accompanying drawings, wherein:—

Figure 1:
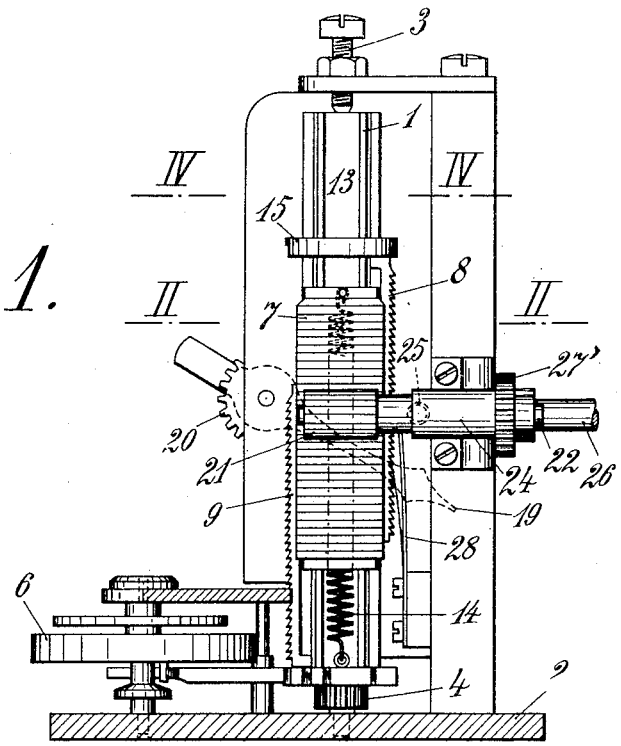
Figure 2:
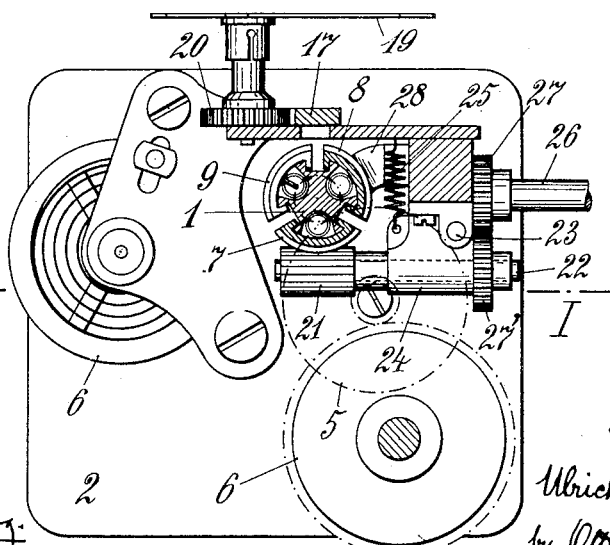
Figure 3:
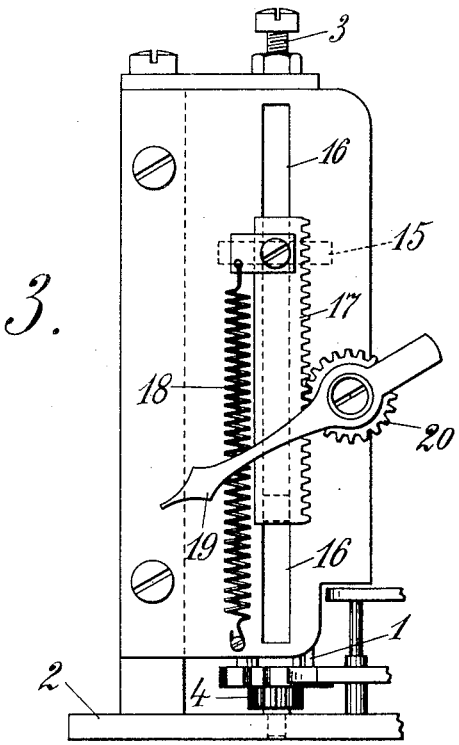
Figure 4:
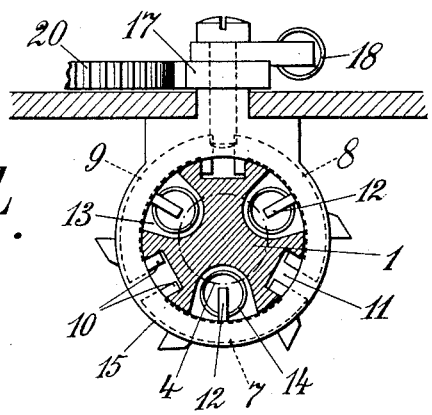

Figure 1 is a rear elevation, partly in section on the line I—I in Fig. 2, showing one construction of my improved tachometer, Fig. 2 is a horizontal section taken on the line II—II in Fig. 1, Fig. 3 is a front elevation, parts having been broken away, and Fig. 4 is a horizontal section, enlarged, taken on the line IV—IV in Fig. 1.

Referring to the drawings, a vertical pillar 1, constituting a guide for the measuring pieces is journaled at one end in the base-plate 2 and rotatably held at the other end by a set-screw 3 screwed into the frame. A pinion 4 fast on the lower end of the guide-pillar meshes with the toothed wheel 5 of the clockwork 6, the latter being so designed that the pillar 1 is rotated intermittently or stepwise through 120° during each of the equal periods of time, the so-called measuring periods, each of one second's duration, for example, three externally toothed measuring-pieces 7, 8, 9, having the form of sectors of a hollow cylinder are slidable longitudinally on the pillar 1; the inwardly directed lugs 10 of these pieces enter into grooves 11 in the guide-pillar and bear against the same. Each measuring-piece has at is upper end a pin 12 carrying one end of a spiral spring 14 which is located in a groove 13 in the pillar and tends to pull the piece to its lowest position. Guided also on the pillar 1 and located above the measuring-pieces is a ring 15, to which is fastened a toothed rack 17 sliding, under control of a spring 18, in a slot 16 in the frame and meshing with a pinion 20 carrying the pointer 19. To effect the displacement of the measuring-pieces I provide a toothed roller 21 whose axle 22 is journaled in a bearing 24 rotatable about the pin 23, and is continually held in engagement with one of the measuring-pieces by a spring 25.

26 is the driving spindle of the tachometer whose speed is to be measured. This spindle is coupled with the shaft under test in a suitable manner, and transmits its motion by means of two spur gears 27, 27' to the axle 22 of the toothed roller 21. A spring 28 fast on the frame is for holding each measuring-piece in the position it occupies when it leaves the roller 21.

As above stated, the bearing 24 is adapted for rotation about the pin 23, and this construction is employed to obviate any tendency of the measuring pieces to operate inaccurately. It may occur at times that the toothed roller 21 does not immediately mesh with one of the measuring pieces, as when the point of a tooth on one member strikes the point of a tooth on the other member, and in that case the roller would not operate correctly, and the indications of the tachometer would be detrimentally affected. To obviate this, the axle 22 of the roller 21 is controlled by the spring 25 which forces the roller 21 against one of the measuring pieces, thus providing for immediate meshing of the roller with the measuring piece. To allow for this action, the bearing 24 of the axle 22 must be rotatable about the pin 23, even though only to a slight extent.

In the position of the guide-pillar 1 shown in the drawings the measuring-piece 7 is in mesh with the roller 21 and during the predetermined measuring period, e. g. one second, it is moved according to the speed of the shaft under test a greater or less distance upwardly along the pillar 1. During the period immediately preceding this, the measuring-piece 8 has been raised to the position indicated, where it is arrested by the spring 28 and firmly holds the ring 15 and the points 19 in a certain position. The measuring-piece 9 has been drawn down at the beginning of the measuring period just expired by its own spring 14 into its lowest position. Now if during the measuring period when the roller 21 is in engagement with the measuring-piece 7, the speed of the shaft 26 becomes higher than during the previous measuring period, the measuring-piece 7 when near the end of the current period will abut against the ring 15 supported by the piece 8 and raise the ring somewhat higher. At the end of the measuring period, when the pillar is rotated by the clockwork through 120°, the piece 7 is out of range of the toothed roller 21 and held in its final position by the spring 28 which now engages between the teeth of this measuring piece, and the pointer is thus again set for the next measuring period. Instead of the piece 7, the measuring-piece 9 now gears with the roller 21, the piece 8 being released and brought by its spring 14 to its lowest position. If during the two above-described measuring periods the speed has remained constant, the ring 15 does not change its position; but if the speed falls, at the moment the pillar 1 rotates the ring 15 will descend onto that measuring-piece which has just left the roller 21, and the pointer 19 correspondingly changes its position.

It is evident from the drawings that the described apparatus possesses no parts liable to be damaged by vibration or rough treatment, or liable to get out of order. The number of members used for adjusting the pointer is reduced to a minimum, and all the parts are of great simplicity so that they are adapted for duplication manufacture.

I claim:—

1. In a tachometer, the combination with a shaft, of a rotatable guide, measuring-pieces arranged around the guide, movable along the same, and adapted to engage with and be driven rectilinearly in turn by the shaft, clockwork for intermittently rotating the guide, a pointer, and means operatively connected with the pointer and controlled by the rectilinear adjustment of the measuring-pieces for adjusting the pointer.

2. In a tachometer, the combination with a shaft, of a rotatable guide, measuring-pieces arranged around the guide, movable along the same, and adapted to engage with and be driven rectilinearly in turn by the shaft, clockwork for intermittently rotating the guide, a pointer, a detent for temporarily retaining each measuring-piece in turn in that position into which each is driven by the shaft after the same has left the shaft, and means for successively indicating the positions of the measuring-pieces held by the detent.

3. In a tachometer, the combination with a shaft, of a vertical, rotatable guide, downwardly spring-pulled measuring-pieces arranged around the guide, movable along the same, and adapted to engage with and be driven rectilinearly in turn by the shaft, clockwork for intermittently rotating the guide, a rotatable pointer, a detent for temporarily retaining each measuring-piece in turn in that position into which each is driven by the shaft after the same has left the shaft, a toothed rack geared with the pointer, and a downwardly spring-pulled ring carrying the rack and slidable along the guide above the measuring-pieces.

4. A tachometer of the character described, comprising in combination a rotatable guide member, a plurality of spring-controlled, toothed measuring-pieces slidable on and arranged symmetrically around said member, an annular member slidable on said guide member, a spring-controlled pointer operatively connected with said annular member, a toothed roller adapted to mesh with each of said measuring-pieces in turn, a detent adapted to engage a measuring-piece adjacent to a measuring-piece in mesh with the roller, and means for intermittently rotating said guide member at equal intervals of time to cause each measuring-piece to mesh with said toothed roller.

5. In a tachometer, the combination with a rotatable vertical guide, of toothed spring-pulled measuring-pieces movable longitudinally along the same, a rotatable bearing, a shaft journaled in the latter, a toothed gear fast on the shaft and adapted to mesh with the measuring pieces in turn, and indicating means controlled by the measuring-pieces.

In testimony whereof, I affix my signature in the presence of two witnesses.

ULRICH KOHLER.

Witnesses:
 FRIEDRICH NAEGEIR,
 FRIEDRICH MONING.